(12) United States Patent
Borghini et al.

(10) Patent No.: US 8,392,933 B2
(45) Date of Patent: Mar. 5, 2013

(54) OPEN GATEWAY FRAMEWORK

(75) Inventors: Marco Borghini, Civitavecchia (IT);
Giuseppe Capuozzo, Rome (IT);
Gianluca D'Angelo, Casalnuovo di Napoli (IT)

(73) Assignee: Accenture Global Services Limited, Dublin (IE)

( * ) Notice: Subject to any disclaimer, the term of this patent is extended or adjusted under 35 U.S.C. 154(b) by 355 days.

(21) Appl. No.: 12/771,996

(22) Filed: Apr. 30, 2010

(65) Prior Publication Data
US 2011/0202932 A1 Aug. 18, 2011

(30) Foreign Application Priority Data

Feb. 15, 2010 (EP) .................................... 10425034

(51) Int. Cl.
G06F 3/00 (2006.01)
G06F 9/44 (2006.01)
G06F 9/46 (2006.01)
G06F 13/00 (2006.01)

(52) U.S. Cl. ........................ 719/311; 719/313; 719/320

(58) Field of Classification Search .................... None
See application file for complete search history.

(56) References Cited

U.S. PATENT DOCUMENTS

2003/0014521 A1* 1/2003 Elson et al. .................... 709/225
2003/0191823 A1* 10/2003 Bansal et al. .................. 709/220
2004/0002936 A1 1/2004 Majumder et al.
2004/0261126 A1* 12/2004 Addington et al. ........... 725/135
2008/0256225 A1* 10/2008 Suh et al. ...................... 709/223

FOREIGN PATENT DOCUMENTS

EP 2 015 179 A1 1/2009
WO WO 2007/066843 A1 6/2007

OTHER PUBLICATIONS

Broadband Forum Technical Report, TR-069 CPE WAN Management Protocol v1.1, Issue 1, Amendment 2, 138pgs., Dec. 2007.
B J Hargrave and Peter Kriens, OSGi Best Practices, OSGi Alliance Community Event Siemens AG Campus, Munich, Germany Jun. 26-27, 2007, 40pgs.
OSGi Alliance, Leveraging OSGi ™ Technology, A Business Whitepaper, 8pgs., Jun. 8, 2007.
OSGi Alliance, About the OSGi Service Platform, Technical Whitepaper, 20pgs., Jun. 7, 2007.
Extended European Search Report issued for European Patent Application No. 10425034.5-2211, dated Jul. 13, 2010; 8 pgs.

* cited by examiner

Primary Examiner — Andy Ho
Assistant Examiner — Craig Dorais
(74) Attorney, Agent, or Firm — Brinks Hofer Gilson & Lione

(57) ABSTRACT

An open gateway framework addresses the need for efficient modularization, extension, and adaptation of device functionality, such as gateway or set top box functionally. The open gateway framework facilitates rapid third party application development on customer electronic devices, particularly for telecommunications service providers. The open gateway framework provides: portability between different devices; rapid development based on extended platform features with a custom Application Programming Interface (API); and deployment with little or no impact on device base software.

15 Claims, 17 Drawing Sheets

OPEN GATEWAY FRAMEWORK

CROSS REFERENCE TO RELATED APPLICATIONS

This application takes priority to EPO application serial number 104 250 34.5, filed Feb. 15, 2010, which is incorporated herein by reference in its entirety.

BACKGROUND OF THE INVENTION

1. Technical Field

This disclosure relates to an architecture for telecommunications service platforms that facilitates efficient modularization, control, and adaptation of services running on the platforms.

2. Related Art

The digital home and office continue to evolve, incorporate a wider range of sophisticated devices, and become more complex. Customer equipment vendors continue to market new connected consumer electronic devices and advanced and pervasive value-added services for the home and office, integrated with many different consumer electronic devices. However, the digital connected home and office is a complex ecosystem of service platforms in which each device has a closed monolithic design that blocks rapid and efficient development and deployment of new services.

More specifically, the current application development model is a closed and custom one. Under the current model, the customer equipment vendor designs the application, develops it, and embeds it in the device, typically engineered specifically for that particular vendor's device architecture. In particular, this is true for access gateways that provide the point of access to telecommunication services. The telecommunications service providers have no control over the software application lifecycle, as all the development tends to be the sole province of the device vendor. The monolithic design of access gateways makes it difficult to develop and deploy new services with a short time to market, even for the vendor itself.

Therefore, a need exists for enhanced architectures for service creation, execution, and provisioning.

SUMMARY

An open gateway framework addresses the need for efficient modularization, extension, and adaptation of device (e.g., telecommunication gateway) functionality. The open gateway framework may be implemented on other devices, such as set top boxes or other customer premises equipment (CPE). The open gateway framework facilitates rapid application development on customer electronic devices, particularly for telecommunications service providers. The open gateway framework provides portability between different devices, including access gateways and set top boxes; rapid development by leveraging an extended platform features and a consistent Application Programming Interface (API) defined by helper functions; and deployment with little or no impact on device base software, thereby greatly facilitating third party development.

The open gateway framework may be deployed as a complete architecture for application lifecycle management. The open gateway framework may include one or more of: a customized core interface layer leveraging the OSGi Alliance™ Framework for service creation and execution; a management platform fully integrable with telecommunications service provider Operational Support Systems (OSS)/Business Support Systems (BSS) systems; an application repository; and an API for application development. The open gateway framework is remotely manageable to facilitate effective customer support. Once the telecommunications service provider has integrated the open gateway framework in its devices, the telecommunications service provider is free to develop (and let others develop) new services on those devices.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The open gateway framework may be better understood with reference to the following drawings and description. In the figures, like reference numerals designate corresponding parts throughout the different views.

DETAILED DESCRIPTION OF THE PREFERRED EMBODIMENTS

Figure 1:
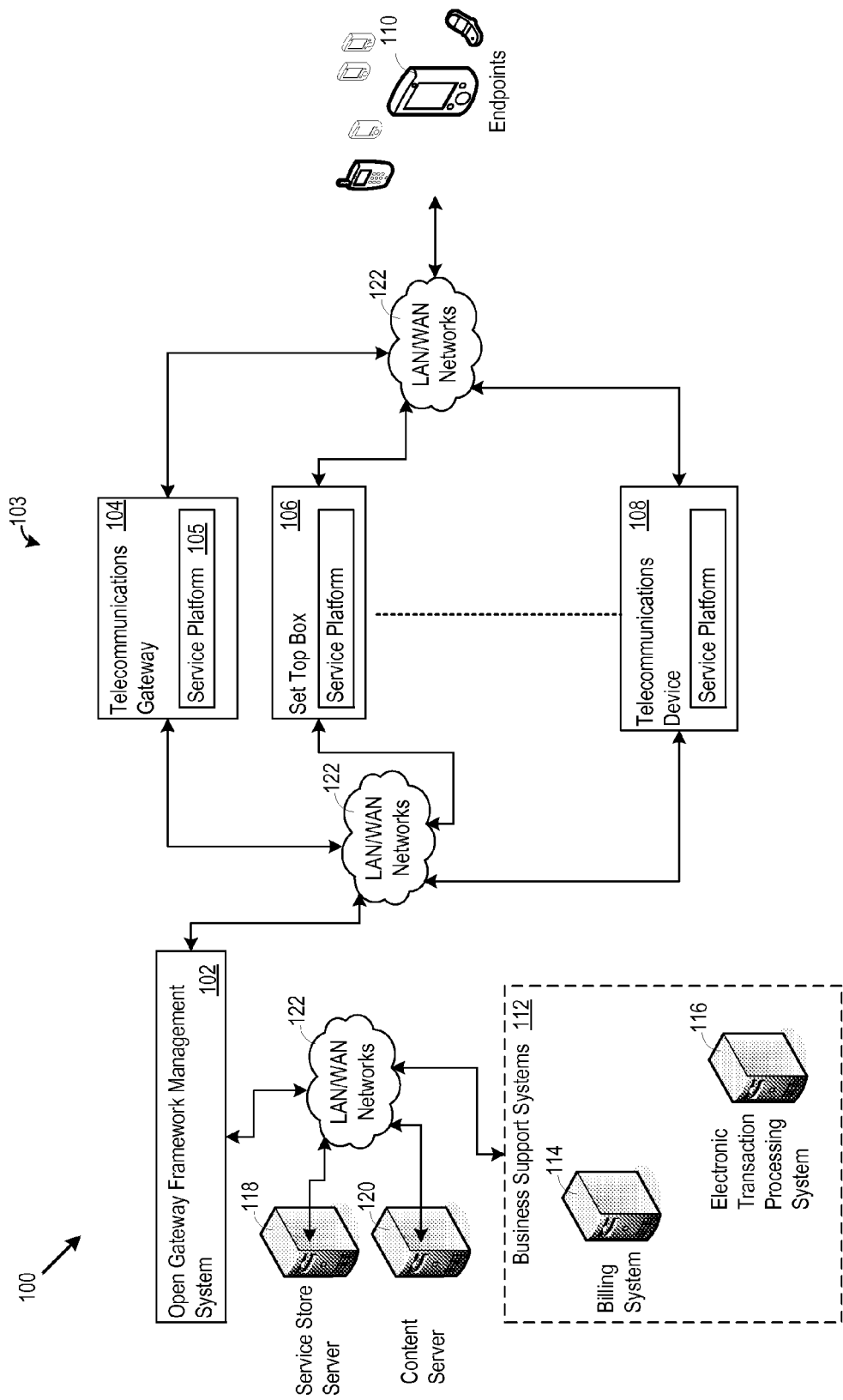
FIG. 1 shows an architecture illustrating implementation and management of an open gateway framework.

FIG. 1 shows an architecture 100 illustrating implementation and management of open gateway frameworks on various service platforms. The architecture includes an open gateway framework management system ("management system") 102. There may be any number and variety of devices 103 in communication with the management system 102. FIG. 1 shows three examples: a telecommunications gateway 104, a set top box 106, and a general purpose telecommunications device 108. The devices 103 provide telecommunications services to the endpoints 110. Any of the devices 103 may include a custom service platform (e.g., the custom service platform 105). The open gateway framework described below implements the service platform 105, and may be adapted to any particular device and its hardware and software configuration. The management system 102 may also communicate with business support systems (BSS) 112.

The gateways may include systems that interface to cellular phones, smartphones, personal data assistants or other telecommunications devices. The set top boxes may include devices provided by cable television service providers to deliver television, VoIP, or other services to consumers in their homes or offices. In general, the management system 102 may manage, as described in more detail below, any device that delivers services to subscribers.

The endpoints 110 may represent any consumer of telecommunications services. One example of an endpoint 110 is a cellular phone that subscribes to a Short Message Service (SMS) hosted at the telecommunications gateway 104. Another example of an endpoint is a digital video recorder that subscribes to a television programming information service delivered by the set top box 106.

The BSS 112 facilitates transaction processing for the management system 102. To that end, the BSS 112 may include, as examples, a billing system 114 and an electronic transaction processing system 116. The BSS 112 may communicate with the management system 102 to accept payment information (e.g., credit or debit card information), process payments, credit or debit pre-paid or post-paid accounts, return account balance information, payment authorizations, or take other actions as requested by the management system 102.

The BSS 112 supports, as one example, the third party purchase of additional services. The service store server 118 may host the purchase interfaces, service catalogs, and other purchase infrastructure. The content server 120 may store the services for delivery to the devices 103. The architecture 100 may be implemented in many different ways, however. For example, the functionality of any of the systems 102, 114, 116, 118, 120 may be implemented in fewer discrete systems (e.g., the management system 102 may perform all of the functionality), or further distributed among additional systems. The networks 122 provide the communication infrastructure through which the various systems and endpoints communicate, and may include any combination of wireline or wireless local or wide area networks, including the Internet.

Figure 2:
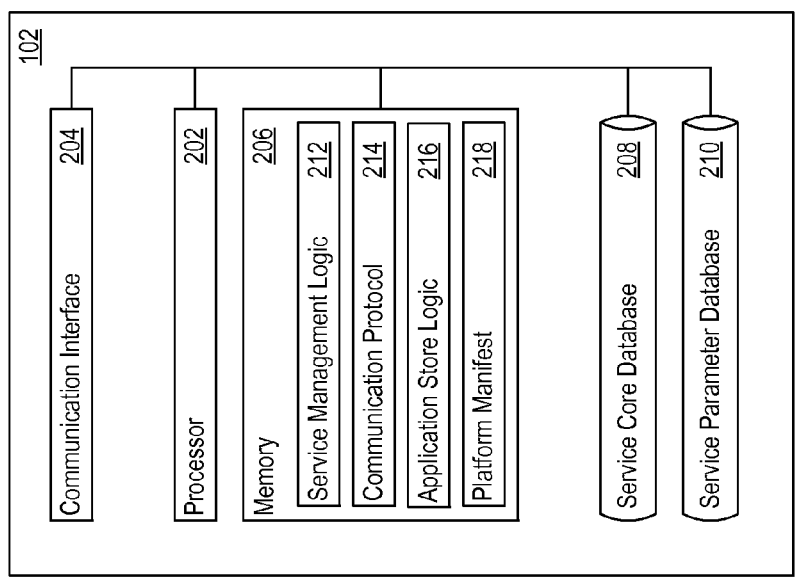
FIG. 2 shows an open gateway framework management system.

FIG. 2 shows one exemplary implementation of the management system 102. A processor 202 is connected to a communication interface 204, a memory 206, and databases 208 and 210. A service core database 208 and a service parameter database 210 support the management system 102.

The service management logic 212 coordinates the overall function of the management system 102. Specific examples of functionality that the service management logic 212 may implement are discussed below. In support of the service management logic 212, the communication protocol 214 provides a message handler and interpreter for messages received at the communication interface 204. In one implementation, the communication protocol 214 may be the TR-069 communication protocol for remote management of devices, extended to support the functionality noted below.

As noted above, there may be implementations where the management system 102 also provides the service store functionality. To that end, the management system 102 may include service store logic 216. The service store logic 216 may process a platform manifest 218 or other information to determine which services are available for the device that provided the platform manifest.

Figure 3:
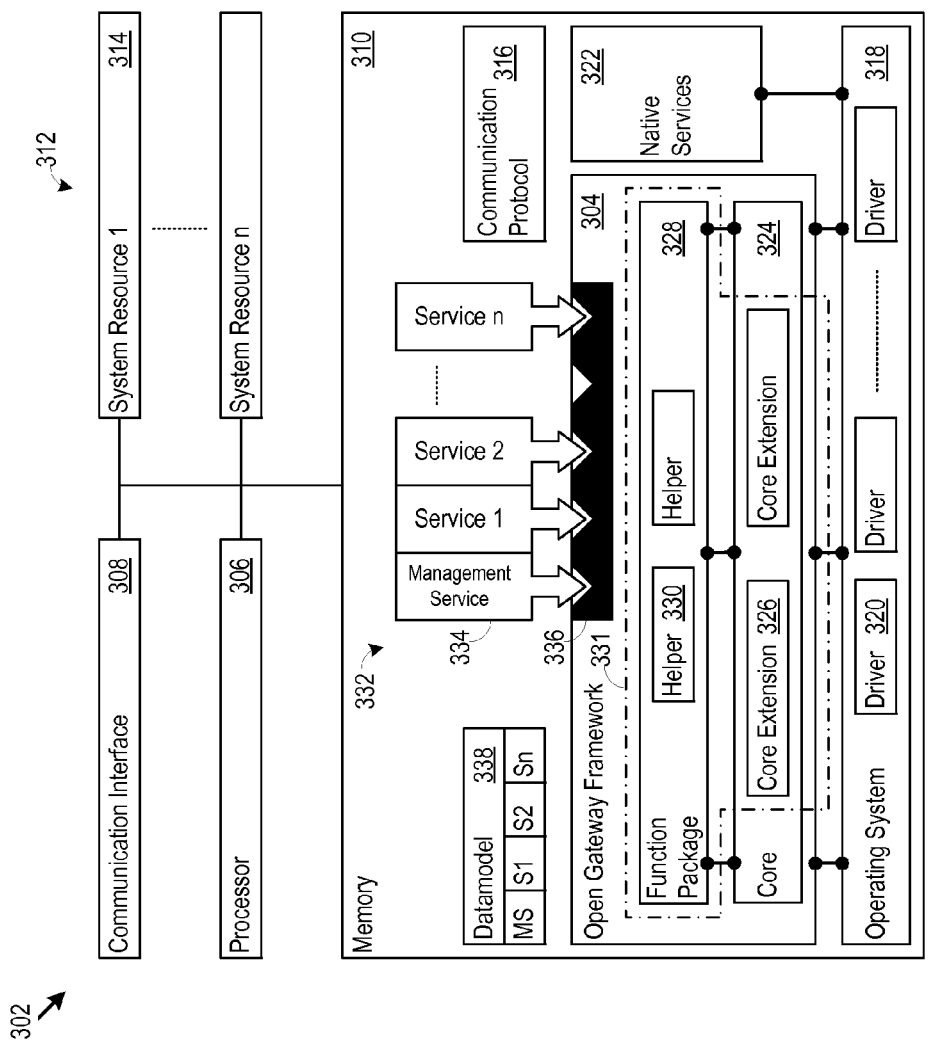
FIG. 3 shows a device that includes an open gateway framework service platform.

FIG. 3 shows a device 302 that includes an open gateway framework 304. The open gateway framework 304 provides a service platform that provides a technical solution to the technical problems of modular, re-usable services that may be remotely managed. A processor 306 connects to a communication interface 308, memory 310, and system resources 312, the first of which is labeled system resource 314. The system resources 312 may represent hardware or software resources in place in the device 302. As one example, the system resource 314 may be a hardware audio or video codec. As other examples, the system resource 314 may be a software processor for translating text between languages or searching for the next occurrence of a television program among hundreds of cable television channels.

In support of the open gateway framework 304, the communication protocol 316 provides a message handler and interpreter for messages received at the communication interface 308. In one implementation, the communication protocol 316 may be the TR-069 communication protocol for remote management of devices, extended to support the functionality noted below. To that end, the communication protocol 316 may route incoming messages from the management system 102 to the management service 334, and may facilitate transmission of outgoing messages from the management service 334 to the management system 102.

An operating system 318 provides basic functionality for the device 302. In particular, the operating system 318, including specific drivers (e.g., the driver 320), provides access to the system resources 312. Native services 322 written specifically for the device 302 may make calls to known functions and drivers present in the operative system 318. However, such native services 322 are not readily portable between different device architectures, and must be re-written if they need to be installed on different devices.

The open gateway framework 304 provides a technical solution to the technical problem of service portability and compatibility, as well as to remote management of such services. The open gateway framework 304 acts as an abstraction layer to isolate specific hardware from the exposed functions that all services will have access to, across open gateway frameworks installed on very different devices. In one implementation, the open gateway framework 304 includes a core dynamic module system 324, optionally extended with custom core extensions (e.g., the core extension 326), to implement core functions specifically tailored to the hardware/software configuration of the device 302. The core 324 may be, for example, the OGSi framework that provides a dynamic module system for executing bundles of machine independent code, such as JAVA code. In addition, the open gateway framework 304 further includes a function package 328 that provides helper functions 330.

The helper functions 330 and core 324, including the core extensions 326 (if any), include pre-designed, pre-packaged code that implements a wide range of functions. The functions are accessed through function calls defined by the helper functions 330 and the core 324 and are made available (i.e., "exposed") for access by other entities (e.g., the services 332). The set of function calls that is available typically does not change between open gateway frameworks, although there may be some function calls that are not available on all devices because of hardware or software limitations of the device. On the other hand, the way that the function calls translate to specific underlying system services does change to match the specific device and its hardware configuration. As a result, the set of function calls that is common across multiple devices provides a consistent application programming interface (API), across the multiple devices, that services 332 employ to implement their functionality. In FIG. 3, the set of functions that compose the API are referred to with numeral 336, i.e., the API 336.

The helper functions 330 and the core 324 translate API function calls made by the services 332 into (possibly proprietary and unique) operating system, driver, or system resource specific calls for the device. Thus, each device 302 may have a specific open gateway framework 304, but the services 332 written for the open gateway framework 304 need not change and need not be re-written as they are installed on various devices with differing hardware. Instead, the services 332 plugin directly through the consistent API 336 to the open gateway framework 304 regardless of the specific hardware implementation of a device. The services 332, which are external to the open gateway framework 304 in that they are not included with or part of the open gateway framework 304 itself, may implement any desired processing that the device desires to offer to the endpoints 110, such as, SMS or MMS service, text to speech translation, video and voice conferencing, VoIP or cable television recording services, or other services.

The core extensions 326 (if any) and the function package 328 together form an open and custom service platform structure 331 on top of the operating system 318. The custom service platform structure 331 is part of the open gateway framework 304, and supports custom services that are highly portable between different hardware as an extension to base functionality in the core 324. FIG. 3 shows several examples of such services 332. In particular, one of the services 332 is a management service 334. As will be explained in more detail below, the management service 334 coordinates interaction of the device 302 with the management system 102 so that the management system 102 may perform centralized and remote control over the services running in the devices 103. A datamodel 338 may store service parameters for any of the services 332, including the management service. The management service 334 may monitor, change, report, or otherwise manipulate service parameters in the database as directed by the management system 102.

The open gateway framework exposes functions that are available to services. A service developer rapidly develops a service, leveraging the pre-designed exposed functions implemented by the helper functions 330. The helper functions 330 use, in turn, the core and core extensions to implement their functions. The core 324 and core extensions 326 may call specific device drivers or operating system functions to carry out the required processing.

Figure 4:
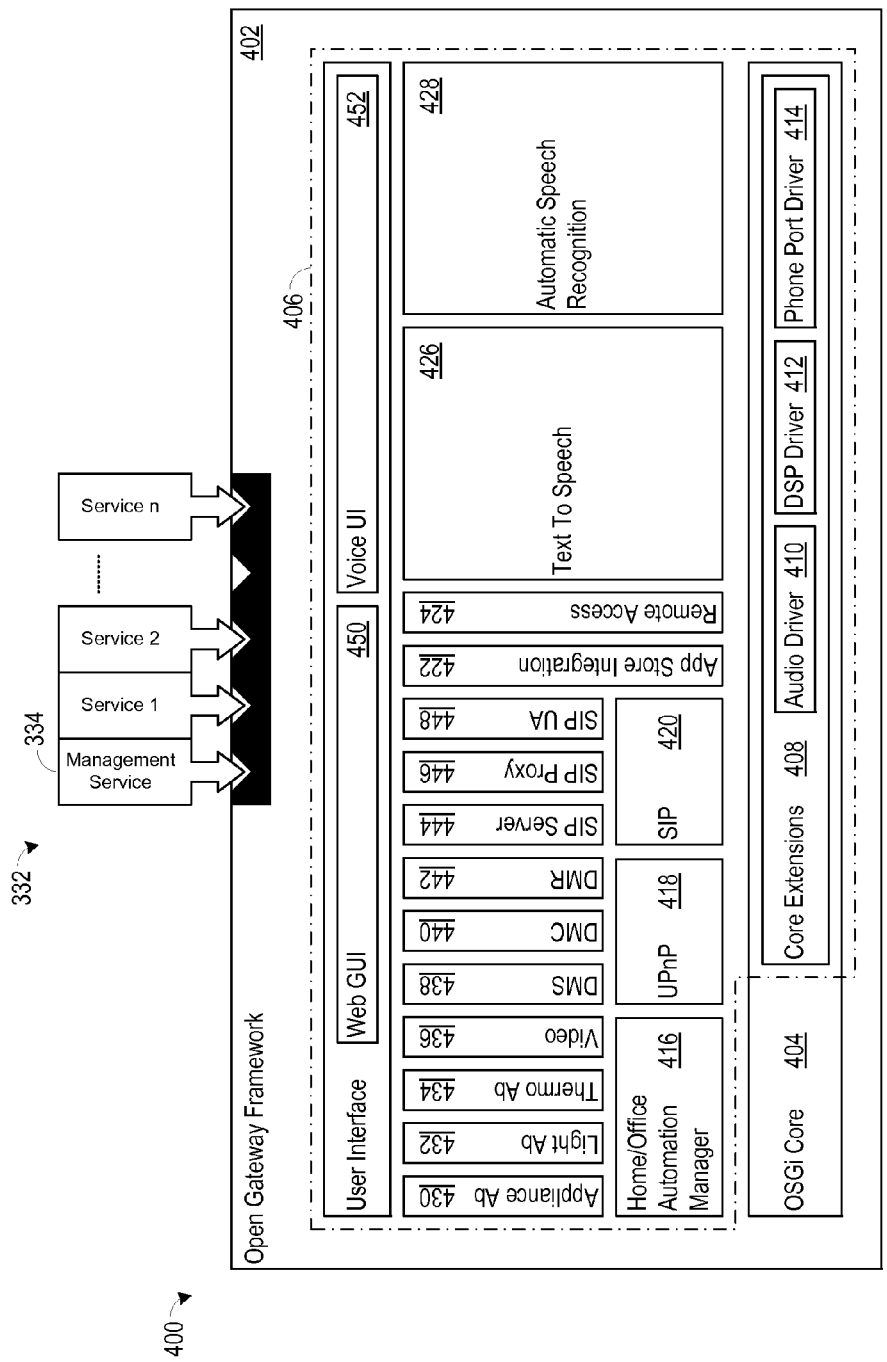
FIG. 4 shows another example of an open gateway framework service platform.

FIG. 4 shows another example of a service platform 400 implemented with an open gateway framework 402. The open gateway framework 402 extends the OGSi core 404 and operating system with a custom service platform structure 406 that includes core extensions 408, including an audio driver 410, Digital Signal Processor (DSP) driver 412, and a phone port driver 414. The custom service platform structure 406 further includes a function package defining several helper functions explained, along with the core extensions, in the table Helpers and Extensions below.

TABLE

Helpers and Extensions

| FIG. 4 Ref. | Name | Type | Description |
| --- | --- | --- | --- |
| 416 | Home/Office Automation Manager | Apps Helper | It provides functions for controlling domestic applications, such as:<br>Select Object<br>Start<br>Stop<br>Intensity Control<br>Set Timer<br>Object State Control<br>and others. |
| 418 | UPnP (Universal Plug n' Play) | Apps Helper | It provides functions for controlling and managing services that use the UPnP protocol, such as:<br>Device Discovery<br>Device Select<br>and others. |
| 420 | SIP (Session Initiation Protocol) | Apps Helper | It provides functions for controlling and managing services that use the SIP protocol, such as:<br>Name Mapping and redirection<br>Capability Negotiation<br>Capabilities Management<br>Participant Management<br>and others. |
| 422 | App Store Integration | Apps Helper | It provides functions for making purchases and managing content on the online portal:<br>Buy<br>Pay<br>Access Control<br>Content Download<br>and others. |

TABLE-continued

Helpers and Extensions

| FIG. 4 Ref. | Name | Type | Description |
|---|---|---|---|
| 424 | Remote Access | Apps Helper | It provides functions for making remote access to services hosted on the device: Access Control Set port and others. |
| 426 | TTS | Apps Helper | It provides functions for performing translation from text to speech. |
| 428 | ASR | Apps Helper | It provides functions for automatic speech recognition. |
| 410 | Audio Driver | Core Extension | It implements functions that support services that require audio capabilities. |
| 412 | DSP Driver | Core Extension | It implements the functionality to call custom DSP functions, such as to aid in audio/video coding or decoding, or for very specialized processing such as signal digitization or analysis. |
| 414 | Phone Port Driver | Core Extension | It implements functions to support the devices connected to telephone lines. |
| 430 | Appliance Abstraction | Apps Helper - Logic Function Abstraction | It simulates the presence of a generic appliance, and abstracts appliance control functionality, for controlling appliances. |
| 432 | Light Abstraction | Apps Helper - Logic Function Abstraction | It simulates the presence of a lighting system, and abstracts light control functionality, for controlling lighting. |
| 434 | Thermostat Abstraction | Apps Helper - Logic Function Abstraction | It simulates the presence of an air conditioning system, and abstracts thermostat control functionality, for controlling thermostats. |
| 436 | Video Surveillance | Apps Helper - Logic Function Abstraction | It simulates the presence of a video surveillance system, and abstracts video control functionality, for controlling video devices. |
| 438 | DMS - Digital Media Server Extender | Apps Helper - Logic Function Abstraction | It is a software module that acts as a facilitator for the implementation of applications whose goal is to provide multimedia content to devices that request it. It may implement the following functions: Browse Access Content Select Content Send Content Progressive Download MIME type reader Bit Rates adapter Encoding type (CBR, VBR) Resolution Set Frame Rate Set Aspect Ratio Set (CIF, QCIF, QVGA . . . ) and others. |
| 440 | DMC - Digital Media Controller Extender | Apps Helper - Logic Function Abstraction | The Digital Media Controller Extender is a software module that acts as a facilitator for the implementation of applications whose goal is to control multimedia content to devices that provide them. It may implement the following functions: Browse Access Content Select Content |

TABLE-continued

Helpers and Extensions

| FIG. 4 Ref. | Name | Type | Description |
|---|---|---|---|
| | | | Get Content |
| | | | Volume Control |
| | | | Content Control (Play, Pause, Stop, Skip, Seek) |
| | | | and others. |
| 442 | DMR - Digital Media Renderer Extender | Apps Helper - Logic Function Abstraction | It is a software module that acts as a facilitator for the implementation of applications whose goal is to request multimedia content to devices that provide them. It may implement the following functions: Browse Access Content Select Content Bit Rates adapter Encoding type (CBR, VBR) Resolution Set Frame Rate Set Aspect Ratio Set (CIF, QCIF, QVGA . . . ) and others. |
| 444 | SIP Server | Apps Helper - Logic Function Abstraction | It hosts the application responsible for receiving the SIP requests from a SIP UA, and on reception returns a response to the request back to the SIP User Agent (UA). |
| 446 | SIP Proxy | Apps Helper - Logic Function Abstraction | It implements the main features required for a SIP PROXY in order to route requests to the user's current location, authenticate and authorize users for services, implement provider call-routing policies, and provide features to users. |
| 448 | SIP UA | Apps Helper - Logic Function Abstraction | It implements a logical network end-point used to create or receive SIP messages and manage a SIP session, it helps manage: Incoming Audio/Video Calls Outgoing Audio/Video Calls Text Messages Supplementary Telephony Services Presence Information Voicemail Functionalities and other functions. |
| 450 | Web GUI | User Interface | It implements a graphical interface for interacting with the service platform using web-based protocols. |
| 452 | Voice UI | User Interface | It implements the User Interface for interaction with the service platform through voice commands |

The user interfaces 450 and 452 may provide configuration, inspection, and analysis functions to an administrator of the devices 103. To that end, the user interfaces 450 and 452 may provide mechanisms for requesting or carrying out the service installation, uninstallation, configuration, monitoring, and activation/deactivation tasks described in detail below with regard to FIGS. 8-15.

Figure 5:
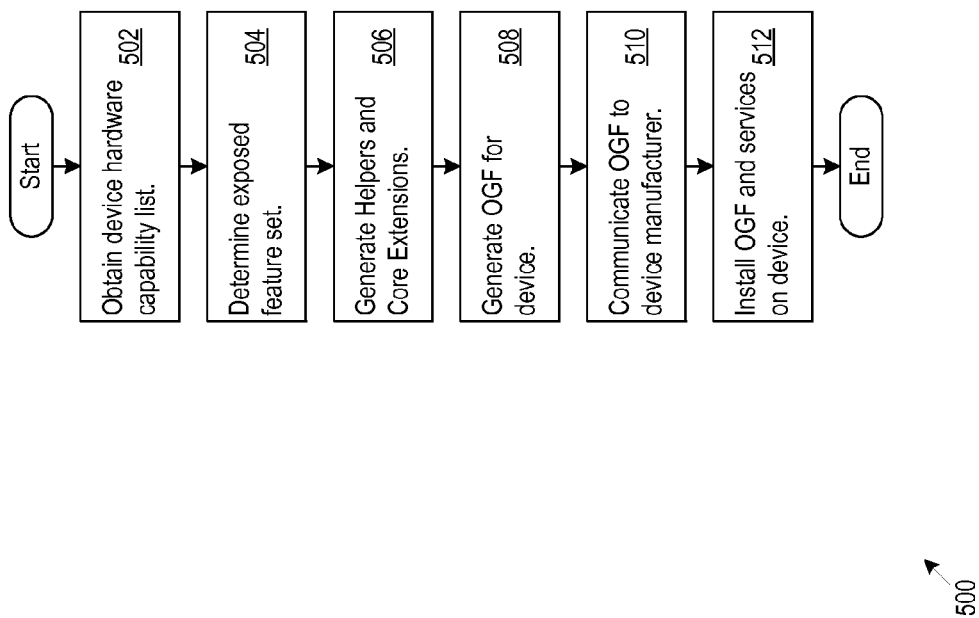
FIG. 5 shows a flow diagram for creating and implementing an open gateway framework.

FIG. 5 shows a flow diagram 500 for creating and implementing a new open gateway framework. In particular, the designer obtains a device hardware capability list (502). The designer may then determine the feature set exposed to services that will plug into the open gateway framework (504). Taking into consideration the hardware capabilities and the desired feature set, the designer generates helper functions and core extensions that newly created services may call to implement their desired functionality (506).

Given the helper functions and the core extensions, the designer generates the open gateway framework for installation on a specific device (508). The open gateway framework may take the form of an installation package communicated to the device manufacturer (510). However, other forms of implementation and distribution of the open gateway framework may also be employed. The device manufacturer installs the open gateway framework on their device (512), for example prior to shipping the device to a customer. Note that the open gateway framework typically remains on the device for the life of the device. However, the services (e.g., the management service) may be upgraded or changed, as may the helpers and core extensions, so there is never a need to wholly replace the open gateway framework.

The device manufacturer may also install selected services obtained from the designer of the open gateway framework, such as the management service 334. In some implementations, the management service 334 may always be present and may not be uninstallable, due to its role in handling communications and configuration commands received from the management system 102.

Figure 6:
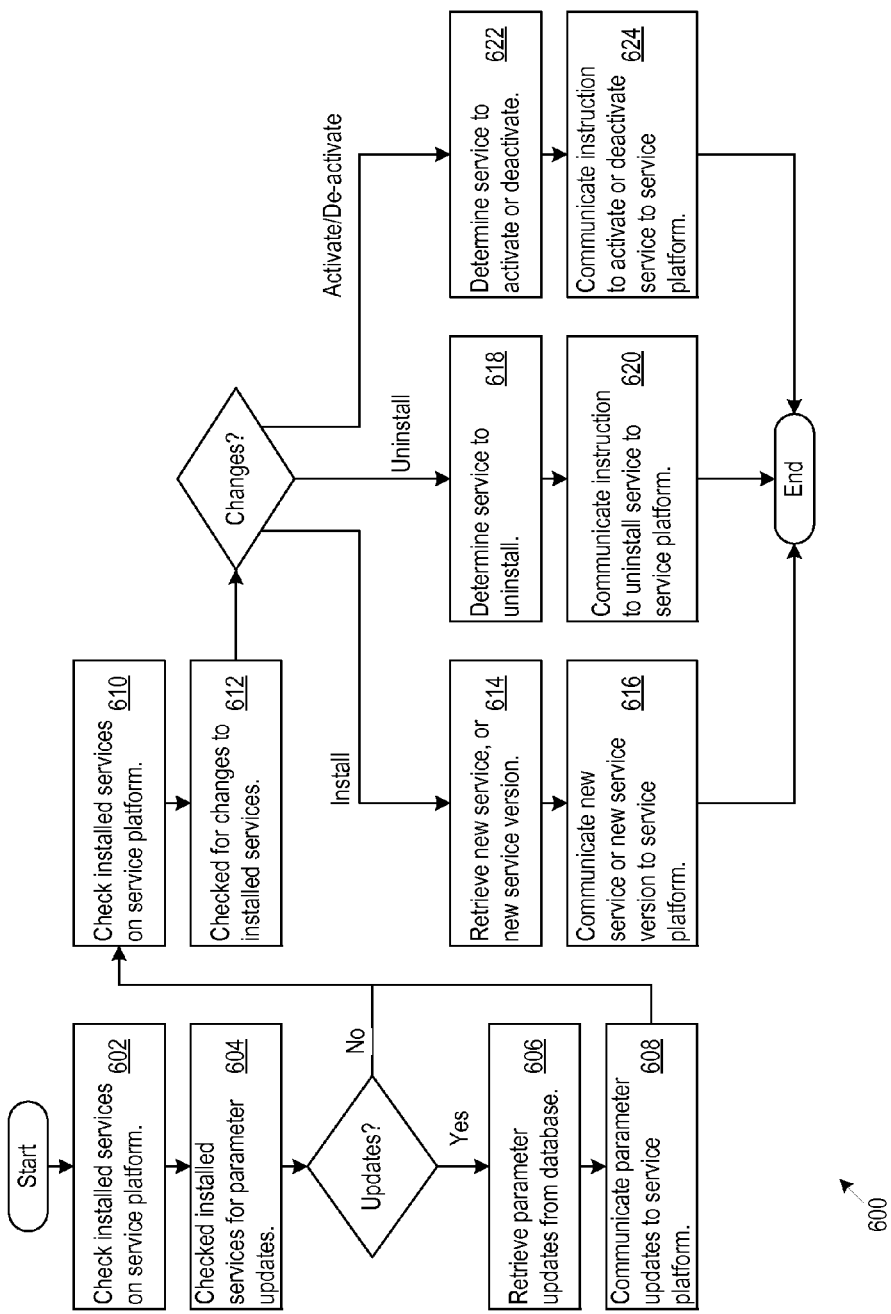
FIG. 6 shows a flow diagram of service management logic in an open gateway framework management system.

FIG. 6 shows a flow diagram 600 of the logic that the service management logic 212 may execute. Specific message flows are discussed below. At any desired time interval, the service management logic 212 may check which services are installed on the service platform (602), such as the services 332 installed on the open gateway framework 304. For each service, the service management logic 212 may determine whether any of the service parameters need to be updated (604). To that end, the service management logic 212 may consult a database of service parameters 210 maintained for each service to determine the current parameter settings. When there are updates for the service parameters, the service management logic 212 retrieves the parameter update (e.g., from the parameter database 210) (606), and communicates the parameter update to the service platform (608). In particular, the service management logic 212 may communicate the parameter update to the service management service 334, which in turn communicates the parameter update to the local service that requires the update.

The service management logic 212 may also check which services are installed on the service platform (610) and check for updates (612). If there are changes or updates for the services, the service management logic 212 may determine whether an Install, Uninstall, or Activate/Deactivate action is needed. For an Install, the service management logic 212 may retrieve the new service or service version (e.g., from the content server 120) (614) and communicate the new service or service version to the service platform (e.g., to the service management service 334, which executes the install) (616). For an Uninstall, the service management logic 212 determines that a service should be removed (618) and communicates an instruction to the service platform (e.g., to the service management service 334, which executes the uninstall) (620). For an Activate or Deactivate, the service management logic 212 determines the service to activate or deactivate (622) and communicates an activation/deactivation instruction to the service platform (e.g., to the service management service 334, which executes the instruction) (624).

Figure 7:
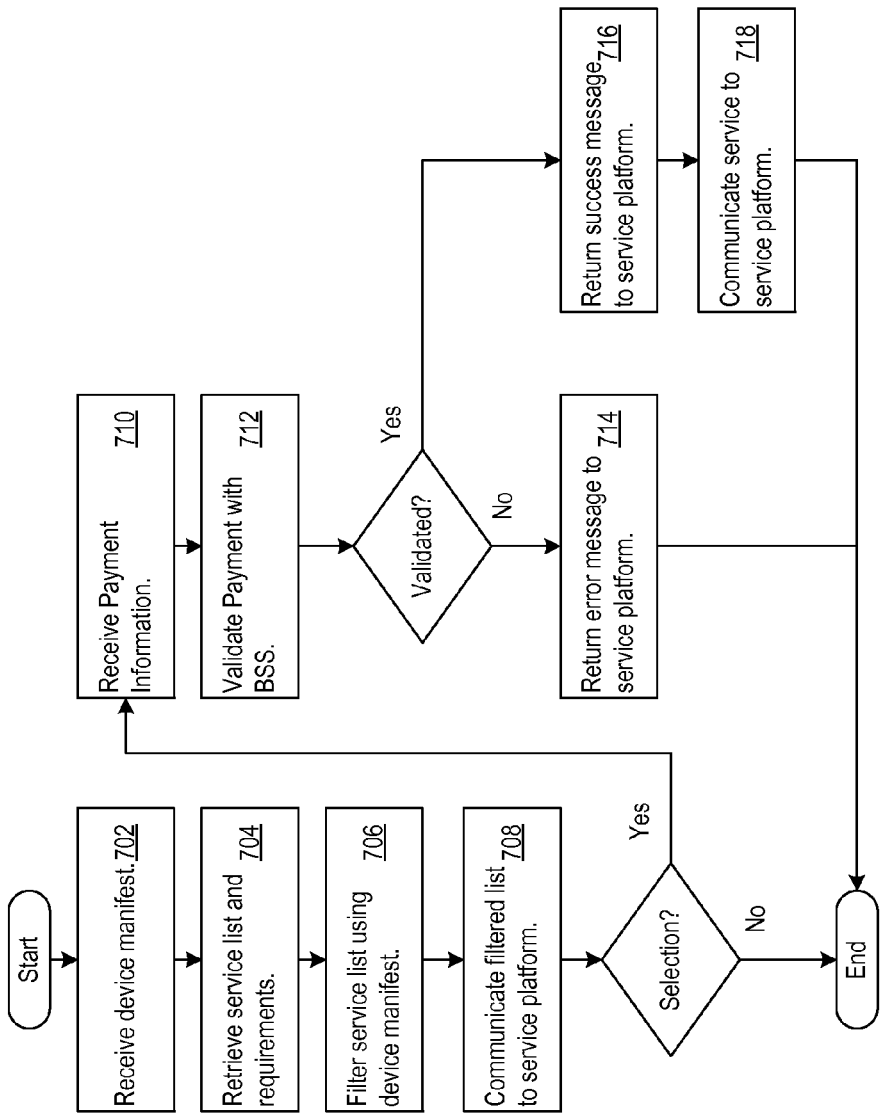
FIG. 7 shows a flow diagram of application store logic in an open gateway framework management system.

FIG. 7 shows a flow diagram 700 of application store logic 216, which may be located in the management system 102, the service store server 118, or elsewhere in the architecture 100. The application store logic 216 receives a device manifest 218 (702). The device manifest 218 may detail the hardware and/or software capabilities of the device. The application store logic 216 retrieves a list of available services and their hardware/software requirements (704), and filters the service list against the hardware/software capabilities specified in the device manifest (706). Thus, for example, if an available service requires audio output hardware, but the device has none, then the application store logic 216 may remove the service from the list of available services.

The application store logic 216 communicates the filtered service list to the service platform (708) and responds to a service selection. The application store logic 216 receives payment information from the service platform (710), such as credit card or debit card information and attempts to validate the payment information with the BSS 112 (712). When the payment information does not validate, then the application store logic 216 communicates an error message back to the service platform (714). Otherwise, the service delivery logic 216 returns a success message to the service platform (716) and arranges communication of the newly purchased service to the service platform (718). In other scenarios, discussed below, service installation or upgrades may be initiated by either the service platform or the management system 102.

The configuration message flows discussed in FIGS. 8-15 refer to interaction of a device and its service platform (e.g., the open gateway framework 304) with other systems, including the management system 102, content server 120, and service store server 118. Configuration messages typically flow across the communication interface (e.g., the communication interface 308) of a given device, and are routed by the communication protocol to the service platform (e.g., the service platform 105). In particular, the incoming messages may be delivered directly to the management service 334 to facilitate the remote management and control of the service platform by the management system 102. Any service platform on any device may process the configuration messages discussed below.

Figure 8:
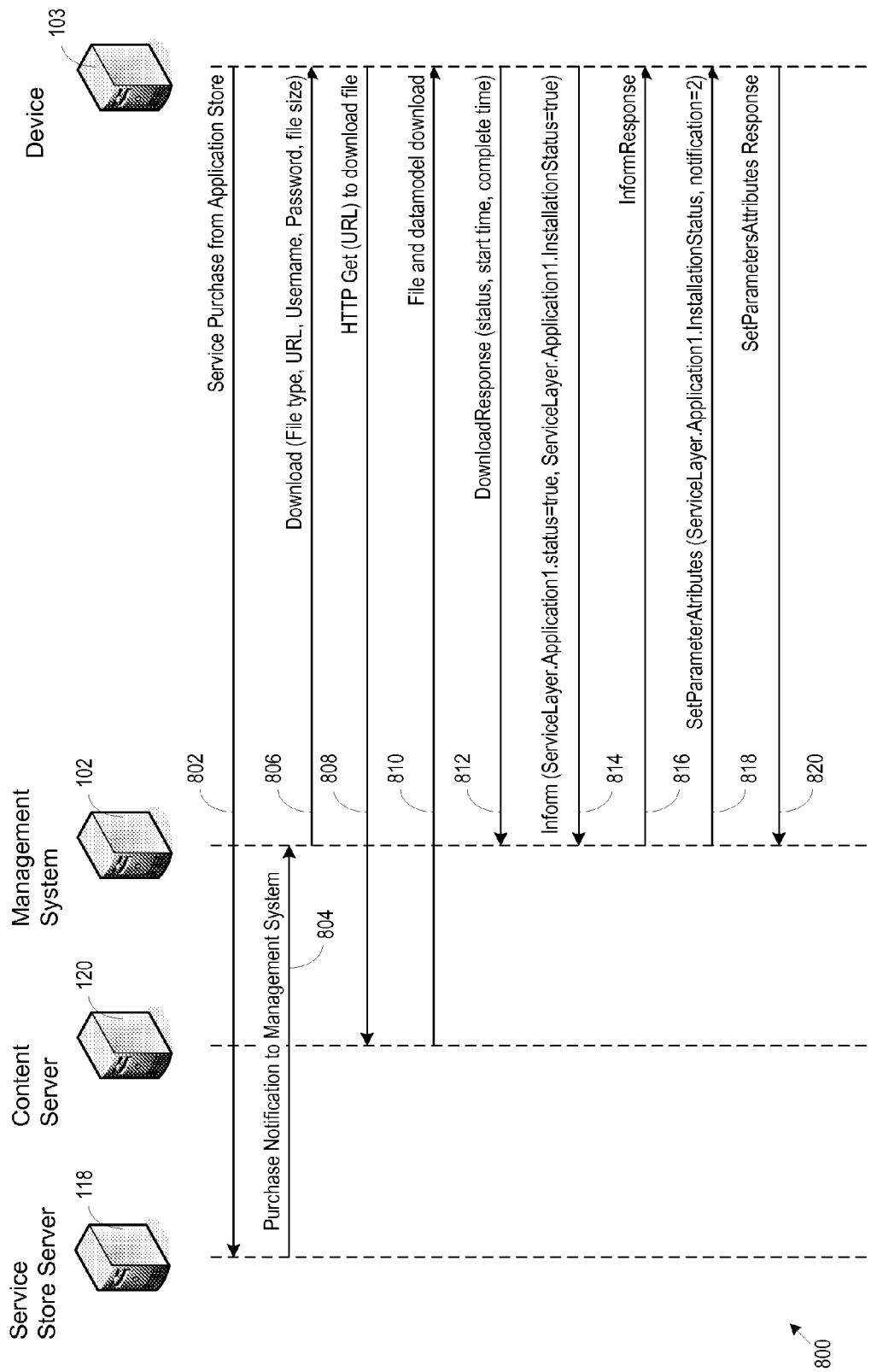
FIG. 8 shows message flow for installation of a new service started by a service platform through a service store.

FIG. 8 shows configuration message flow 800 for installation of a new service started by a service platform (e.g., the service platform 105) through a service store 118. Any of the message flow in the Figures described below may happen via Remote Procedure Calls (RPCs) or other messaging mechanisms. The service platform in the device 103 sends a request for an application purchase (802) to the service store server 118. The service store server 118 notifies the management system 102 (804) so that the management system 102 may keep an updated profile of services installed on the service platform. If all of the conditions for purchase are met (e.g., payment authorization and service authorization), the management system 102 may communicate a download message to the service platform (806). The download message may convey download parameters that the service platform employs to obtain the purchased service, such as: the File Type, Uniform Resource Locator (URL) where the service may be downloaded, a Username and a Password for downloading the service, and the File Size.

The service platform executes a Hypertext Transport Protocol (HTTP) Get on the URL to download the service (808) from the content server 120. The content server 120 returns a message (810) preferably in a signed package format, that includes the installation file in the payload and install command in the command list. Other file transfer options may be employed, including File Transfer Protocol (FTP) or remote file system access. In addition to the installation file, the content server 120 returns a datamodel of parameters for the service to the service platform (810). The service platform locally maintains the databases in connection with running the services. The management system 102 may exercise remote control over the service parameters represented in the datamodel.

The service platform returns a download response message to the management system 102 (812). The download response message may include parameters such as download and installation status (e.g., status=1 if the service has been downloaded and correctly installed), start time, and complete time. When the service platform installs the service, the service platform communicates an Inform message to the management system 102 (814). The Inform message may convey to the management system 102 that the service has been successfully installed and is up and running. The management system 102 returns an Inform Response acknowledgement (816).

In general, the service platform may send an Inform message to the management system 102 after each operation. The Inform message communications results (e.g., successes, failures, or other data). When the management system 102 receives an Inform message from a device, the management system 102 updates a record for that device identified in the Inform message. The management system 102 thereby keeps configuration information on the device in synchronism with the configuration maintained on the management system 102.

The management system 102 may then communicate a parameter setting message to the service platform (818). The parameter setting message may request notifications about the service, such as active notification (i.e., "notification=2") about the installation status of the application. The service platform responds with a SetParametersAttributes Response message (820) to acknowledge receipt of the parameter setting message.

The "notification" parameter is used to direct the service platform to send, or not send, to the management system 102 notifications about service installation changes (e.g., installation or uninstallation). In one implementation, possible values for the notification parameter include:

0=no notification should be sent;

1=passive notification. The service platform (e.g., using the management service 334) sends a notification only when the next Inform message is required to be sent (e.g., for timeout, device reboot, connection request from the management system 102, or other reasons); and 2=active notification. The management service 334 sends a notification as soon as the service status changes.

Figure 9:
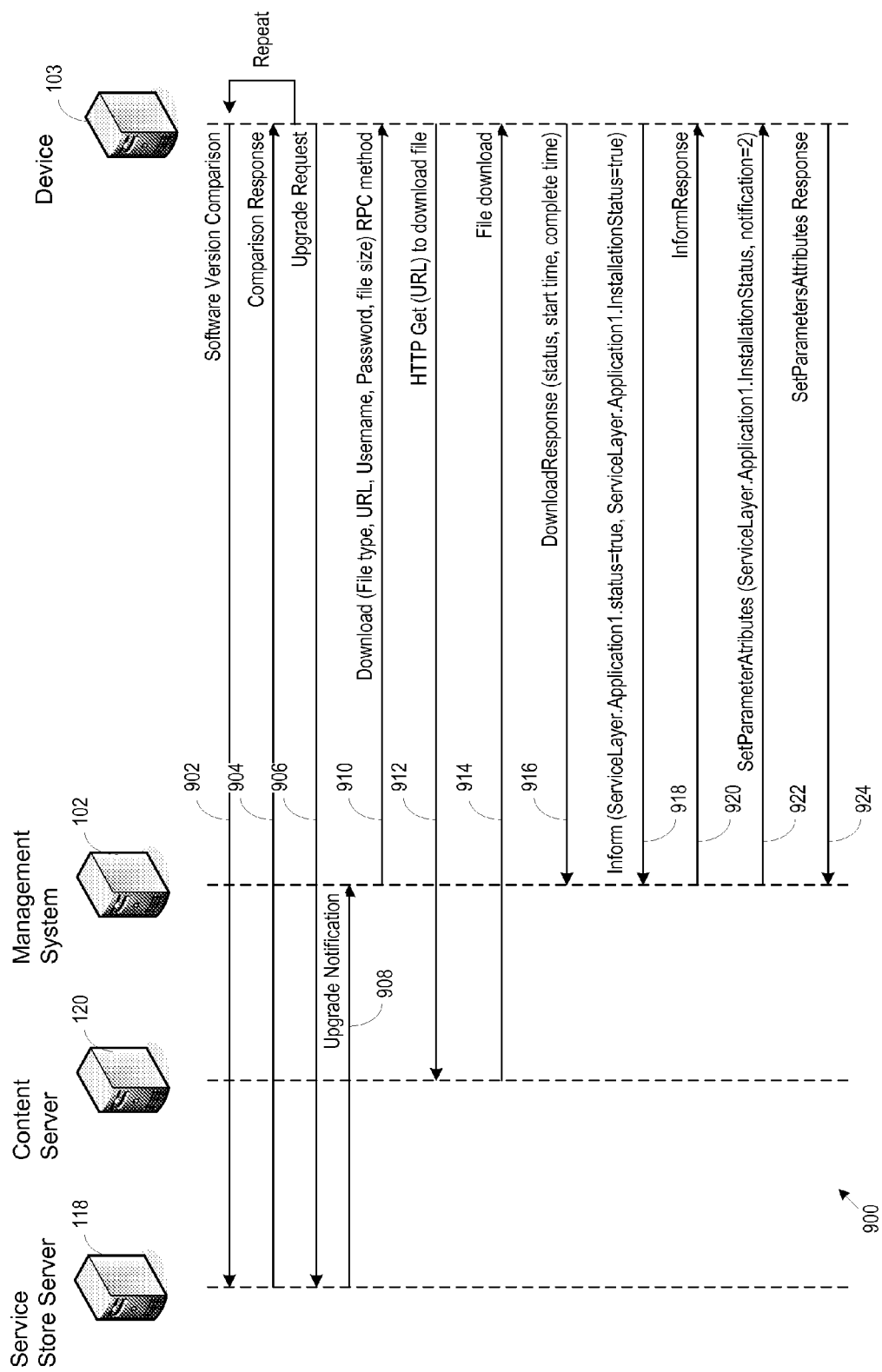
FIG. 9 shows message flow for upgrade of a service started by a service platform through a service store.

FIG. 9 shows configuration message flow 900 for upgrade of a service started by a service platform through an application store, such as the service store server 118. The service platform sends a version comparison message (902) to the service store server 118. The service store server 118 returns a comparison response to the service platform (904). If an upgrade is desired, the service platform sends an upgrade request (906) to the service store server 118. The service store server 118 notifies the management system 102 (908) so that the management system 102 may keep an updated profile of services installed on the service platform.

The management system 102 may communicate a download message to the service platform (910). The service platform executes a Hypertext Transport Protocol (HTTP) Get on the URL to download the service (912) from the content server 120. The content server 120 returns a message (914) preferably in a signed package format, that includes the upgrade file in the payload and upgrade command in the command list The content server 120 returns also a datamodel of parameters (if the new version has a different datamodel) for the service to the service platform (914).

The service platform returns a download response message to the management system 102 (916). The download response message may include parameters such as download status (e.g., success or fail), start time, and complete time. When the service platform installs the upgraded service, the service platform communicates an Inform message to the management system 102 (918). The Inform message may convey to the management system 102 that the upgrade has been successfully installed and is up and running. The management system 102 returns an InformResponse acknowledgement (920).

The management system 102 may then communicate a parameter setting message to the service platform (922). The parameter setting message may request notifications about the service, such as active notification about the installation status of the application. The service platform 105 responds with a SetParametersAttributes Response message (924) to acknowledge receipt of the parameter setting message.

Figure 10:
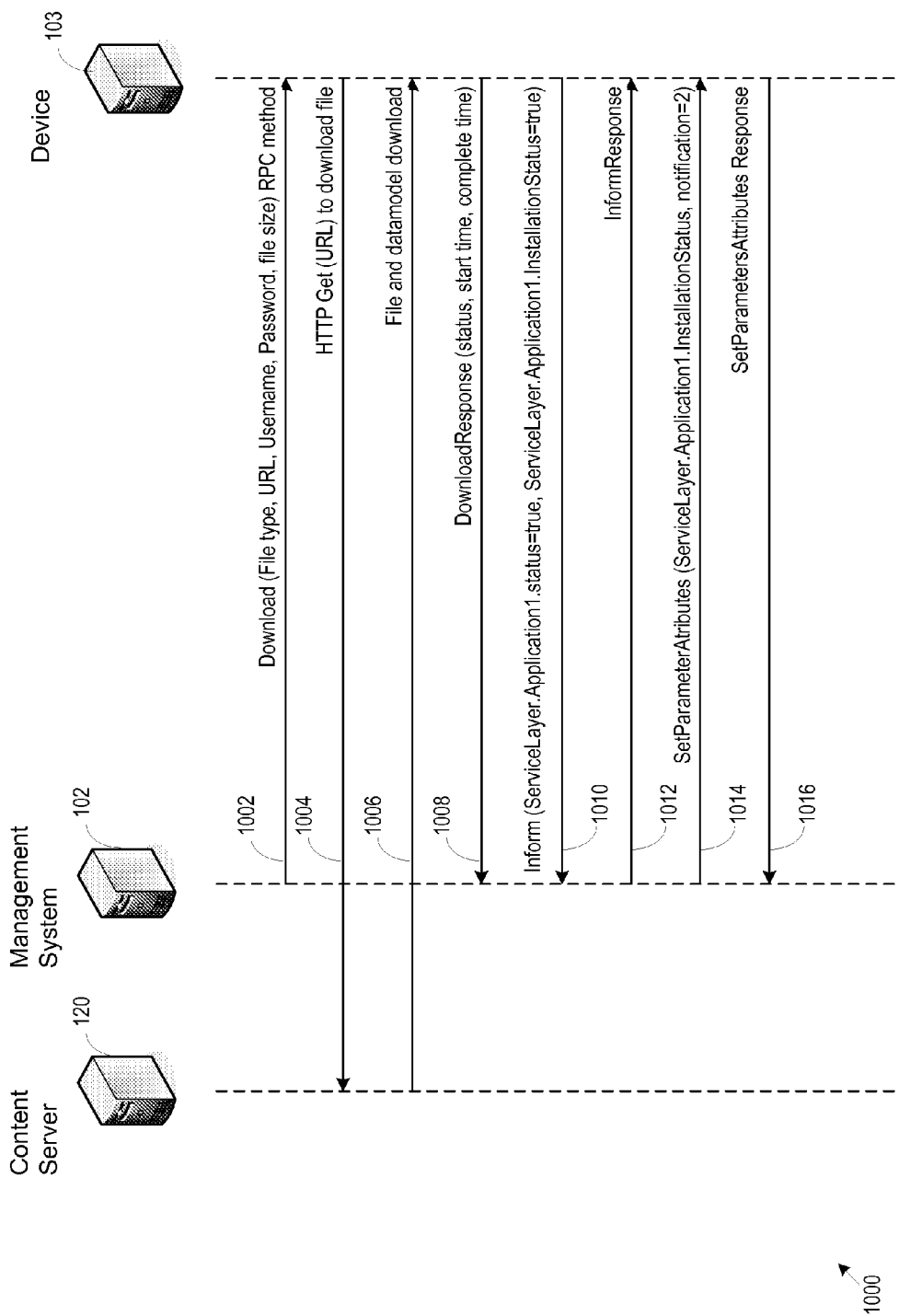
FIG. 10 shows message flow for installation of a new service started by a management system.

FIG. 10 shows configuration message flow 1000 for installation of a new service started by a management system. In instances, for example, where the management system 102 pushes a new service to the service platform 105, the management system may initiate the download process. In particular, the management system 102 may communicate a download message to the service platform (1002). The service platform executes a Hypertext Transport Protocol (HTTP) Get on the URL to download the service (1004) from the content server 120. The content server 120 returns a message (1006) preferably in a signed package format, that includes the installation file in the payload and install command in the command list The content server 120 returns also a datamodel of parameters for the service to the service platform (1006).

The service platform returns a download response message to the management system 102 (1008). The download response message may include parameters such as download status (e.g., status=1 if the service has been downloaded and correctly installed), start time, and complete time. When the service platform installs the upgraded service, the service platform communicates an Inform message to the management system 102 (1010). The Inform message may convey to the management system 102 that the service has been successfully installed and is up and running. The management system 102 returns an InformResponse acknowledgement (1012).

The management system 102 may then communicate a parameter setting message to the service platform (1014). The parameter setting message may request notifications about the service, such as active notification about the installation status of the application. The service platform responds with a SetParametersAttributes Response message (1016) to acknowledge receipt of the parameter setting message.

Figure 11:
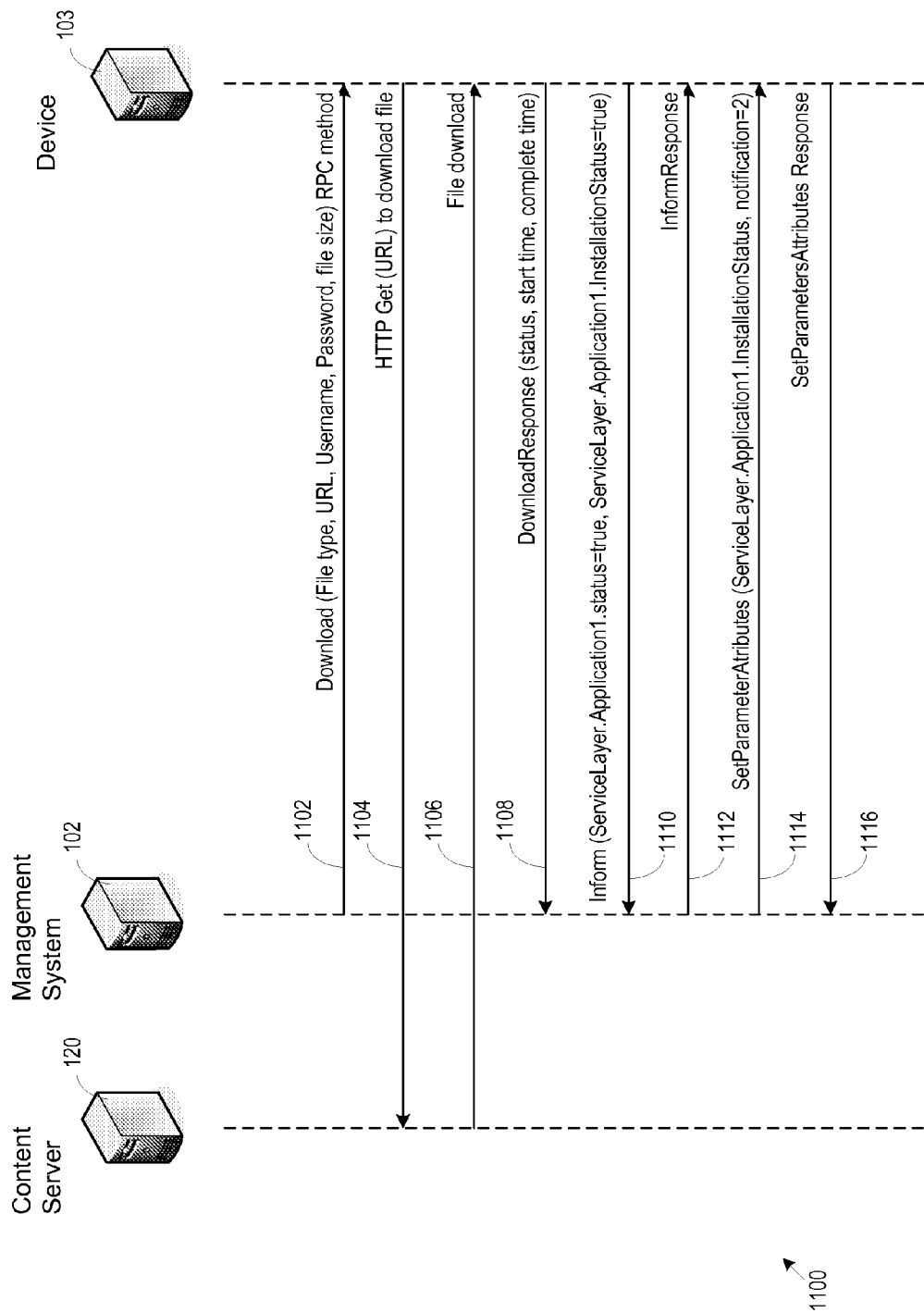
FIG. 11 shows message flow for upgrade of a service started by a management system.

FIG. 11 shows configuration message flow 1100 for upgrade of a service started by a management system. In instances, for example, where the management system 102 pushes an upgrade to the service platform, the management system may initiate the download process. In particular, the management system 102 may communicate a download message to the service platform (1102). The service platform executes a Hypertext Transport Protocol (HTTP) Get on the URL to download the service (1104) from the content server 120. The content server 120 returns a message (1106) preferably in a signed package format, that includes the upgrade file in the payload and upgrade command in the command list The content server 120 returns the upgrade for the service as well as a datamodel of parameters (if required by the upgrade) for the service to the service platform (1106).

The service platform returns a download response message to the management system 102 (1108). The download response message may include parameters such as download status (e.g., status=1 if the service has been downloaded and correctly installed), start time, and complete time. When the service platform installs the upgraded service, the service platform communicates an Inform message to the management system 102 (1110). The Inform message may convey to the management system 102 that the service upgrade has been successfully installed and is up and running. The management system 102 returns an InformResponse acknowledgement (1112).

The management system 102 may then communicate a parameter setting message to the service platform (1114). The parameter setting message may request notifications about the service, such as active notification about the installation status of the application. The service platform responds with a SetParametersAttributes Response message (1116) to acknowledge receipt of the parameter setting message.

Figure 12:
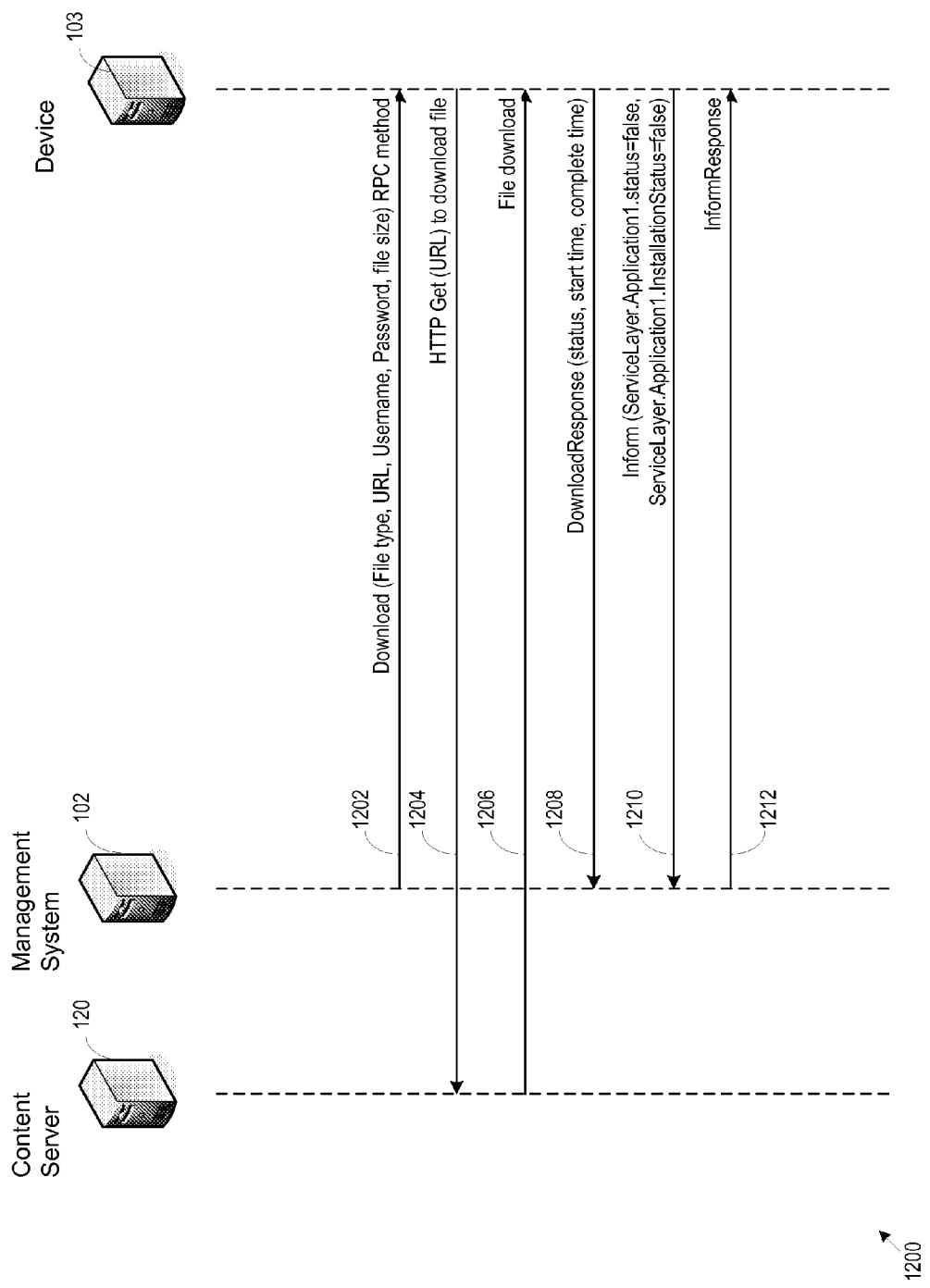
FIG. 12 shows message flow for uninstallation of a service started by a management system.

FIG. 12 shows configuration message flow 1200 for uninstallation of a service started by a management system. The management system 102 may communicate a download message to the service platform (1202). The service platform executes a Hypertext Transport Protocol (HTTP) Get on the URL to download the service (1204) from the content server 120. The content server 120 returns a message with an empty payload, preferably in a signed package format, that includes an Uninstall command in the command list in the message (1206).

The service platform returns a download response message to the management system 102 (1208). The download response message may include parameters such as download status (e.g., success or fail), start time, and complete time. When the service platform executes the command and uninstalls the service, the service platform communicates an Inform message to the management system 102 (1210). The Inform message may convey to the management system 102 that the service has been successfully uninstalled and is no longer running. The management system 102 returns an InformResponse acknowledgement (1212).

Figure 13:
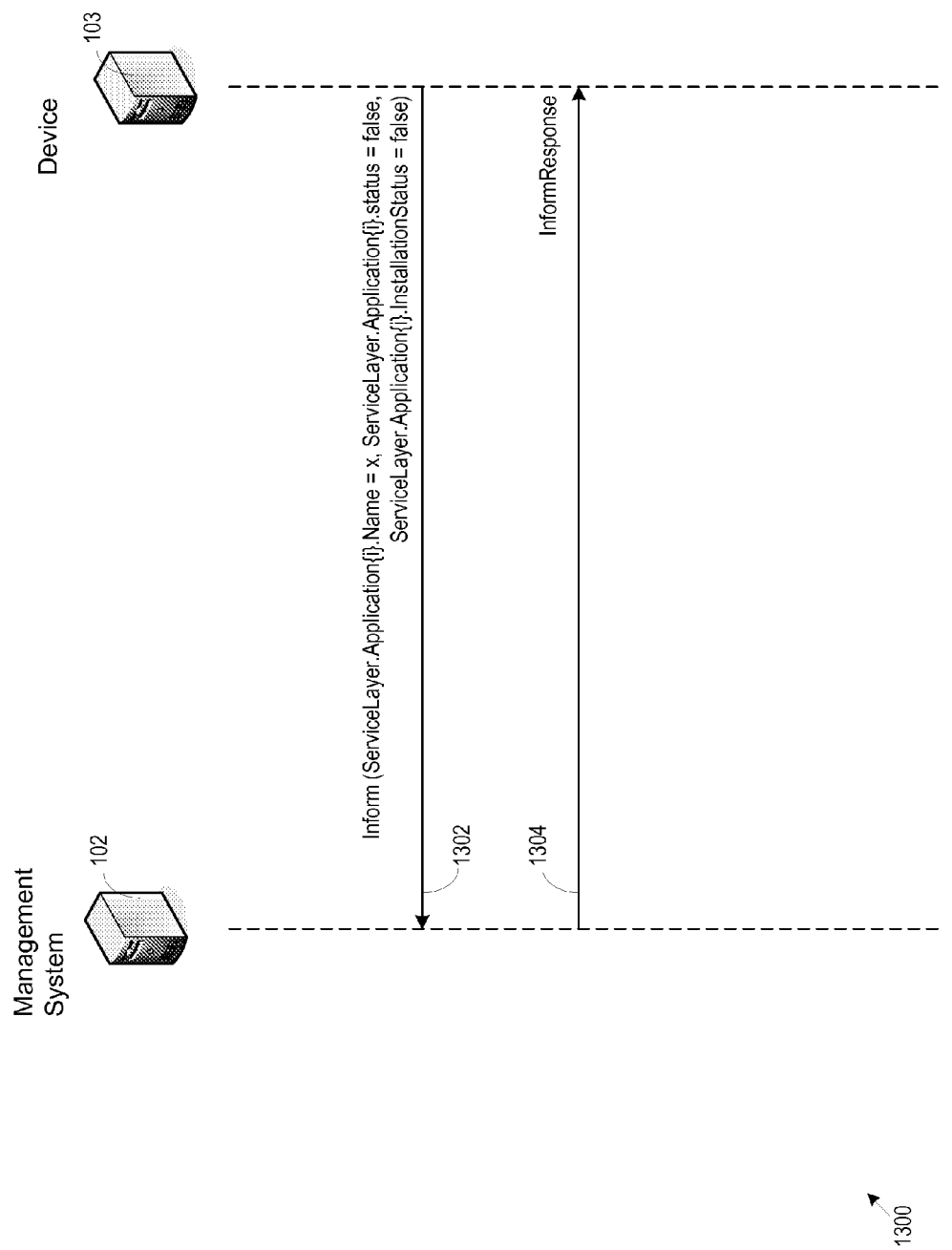
FIG. 13 shows message flow for uninstallation of a service started by a service platform.

FIG. 13 shows configuration message flow 1300 for uninstallation of a service started by a service platform. In particular, the service platform 103 locally uninstalls the service. Afterwards, the service platform communicates an Inform message to the management system 102 (1302). The Inform message may include parameters that convey the name of the uninstalled service, that the service is no longer running, and that uninstallation is complete, as examples. The Inform message is sent because the management system 102 had previously set an active notification on the installation status parameter. The management system 102 returns an acknowledgement response (1304).

Figure 14:
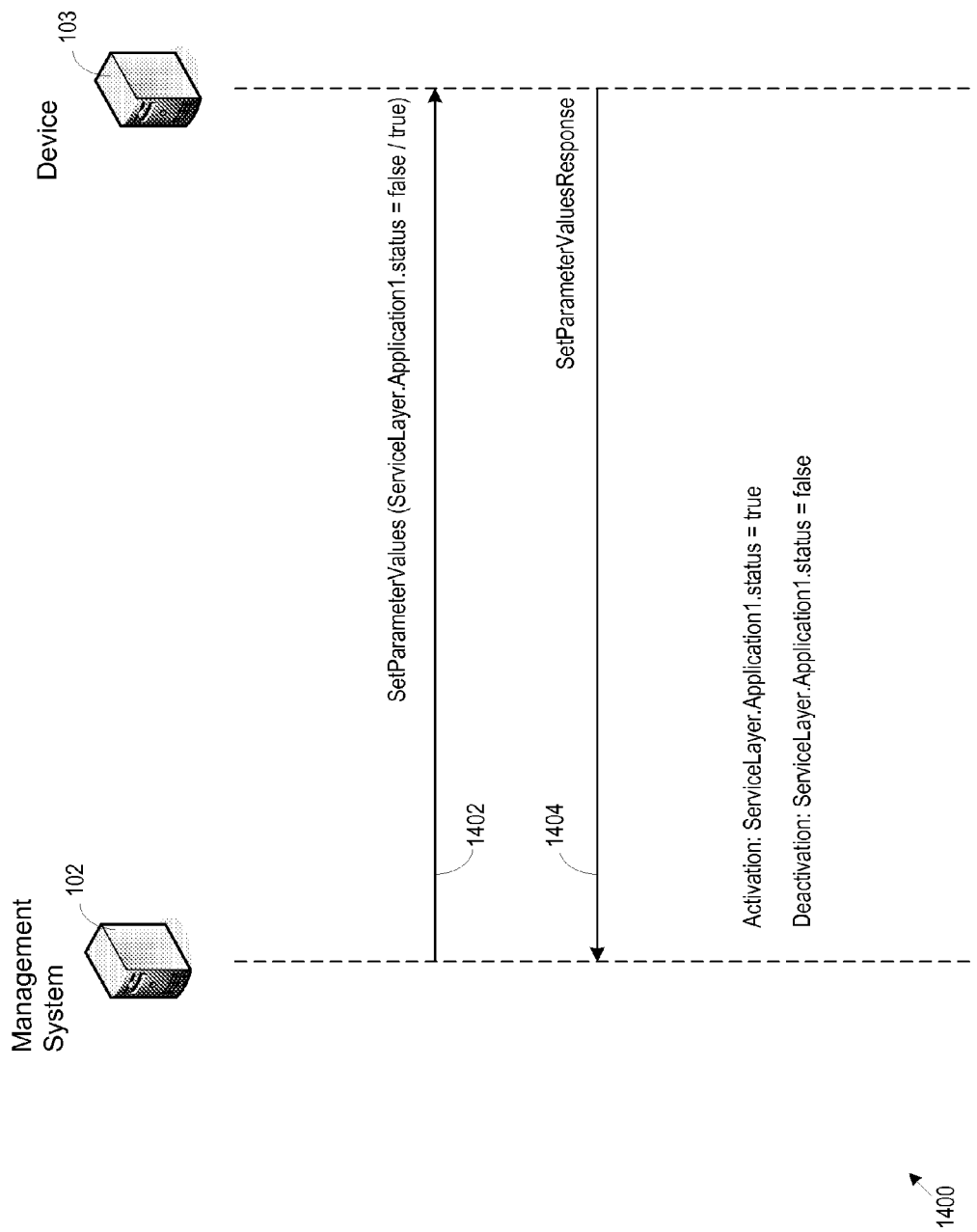
FIG. 14 shows message flow for activation and deactivation of a service by a management system.

FIG. 14 shows configuration message flow 1400 for activation and deactivation of a service by a management system 102. In particular, the management system 102 determines whether to activate or deactivate a service, and in SetParameterValues message sends a parameter setting command specifying activation or deactivation (1402). For activation, the service status may be set to True. For deactivation, the service status may be set to False. The service platform returns an acknowledgement response (1404).

Figure 15:
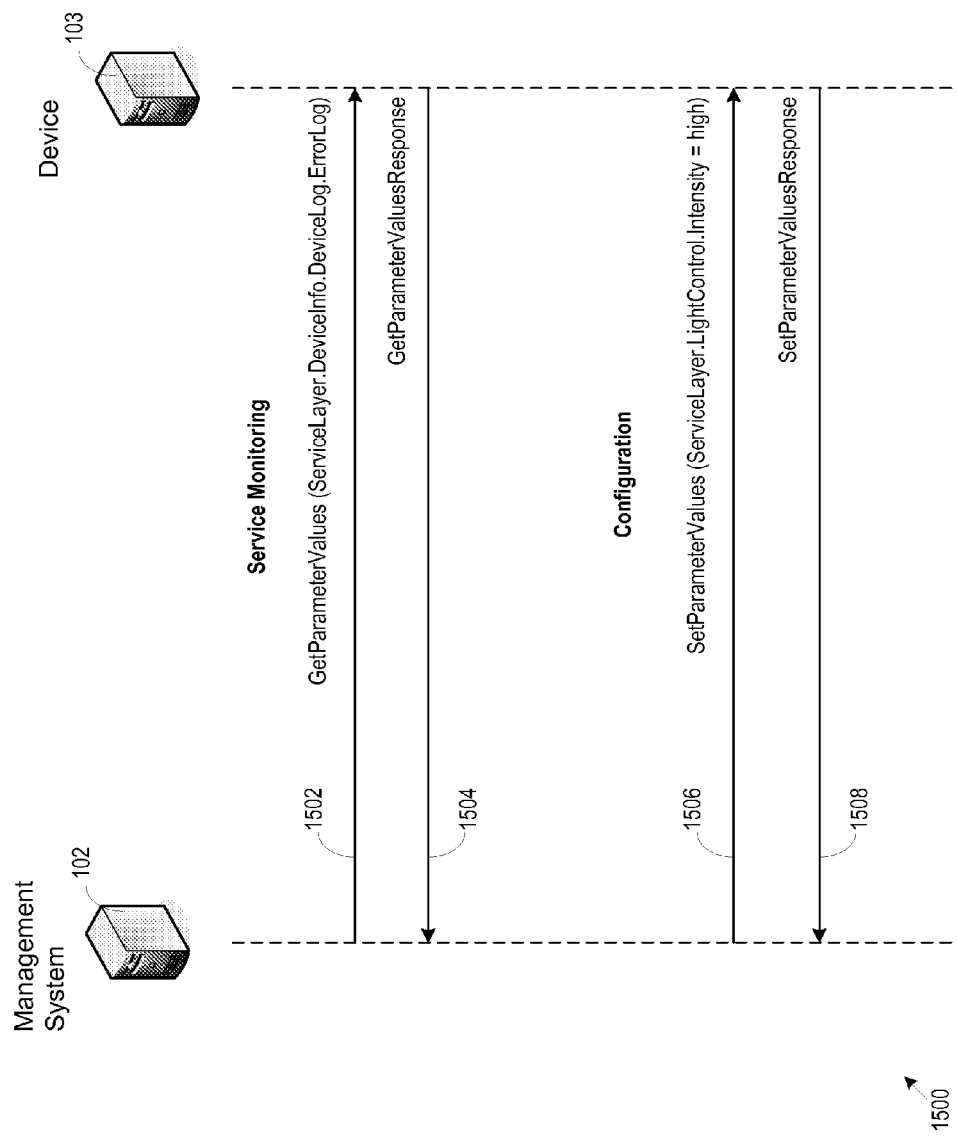
FIG. 15 shows message flow for service monitoring and configuration of services by a management system.

FIG. 15 shows configuration message flow 1500 for service monitoring and configuration of services by a management system. For service monitoring, the management system 102 may send a message (1502) to retrieve the logging data captured by the service platform. The service platform 103 may return (1504) logged data requested by the management system 102.

For service configuration, the management system 102 sends a parameter setting message that specifies that the service platform 103 should set a specific parameter to a specific value (1506). The service platform 103 returns an acknowledgement (1508), optionally indicating success or failure at setting the parameter.

Figure 16:
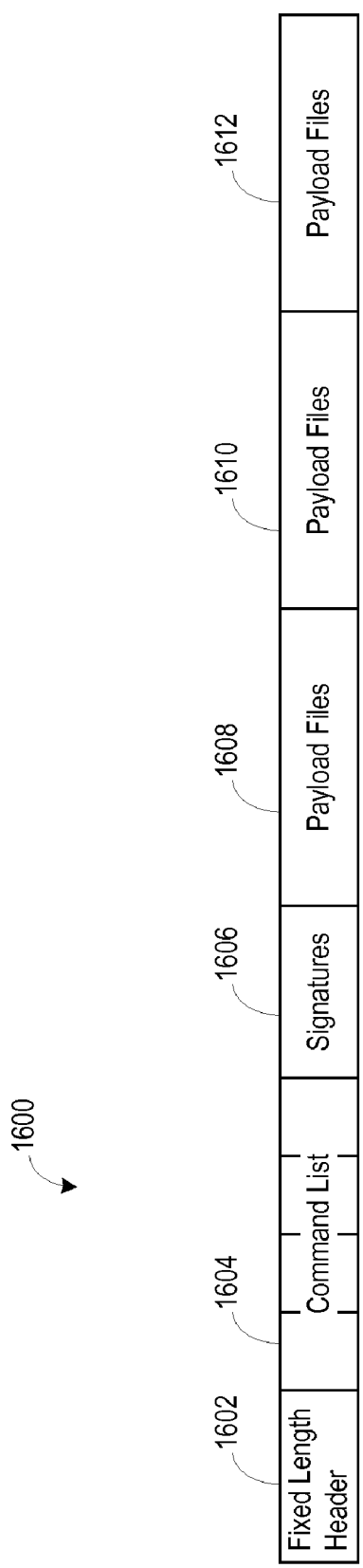
FIG. 16 shows a signed package format for use in communication between a management system and a service platform.

FIG. 16 shows a signed package format 1600 for downloading files and communicating instructions. The signed package format 1600 may be a TR-069 extension, including a fixed length header 1602, a command list 1604, and authentication/authorization signatures 1606. The signed package format may further include sections (e.g., the sections 1608, 1610, 1612) for payload files.

The signed package format may be used to securely download files. The Table: Command Names shows the command names that may be used to support the install, uninstall, upgrade, and other functionalities of the management system 102 as described above. Alternatively, the management system 102 may define its own commands in the 1000-9999 range provided for vender specific commands.

TABLE

Command Names

| Type | Command | Type | Command |
|---|---|---|---|
| 0 | End | 1 | Extract Files |
| 2 | Extract Versioned Files | 3 | Add File |
| 4 | Add Versioned File | 5 | Remove File |
| 6 | Remove Versioned File | 7 | Remove Sub-Tree |
| 8 | Move File | 9 | Move Versioned File |
| 10 | Version | 11 | Description |
| 12 | Recoverable Timeout | 13 | Unrecoverable Timeout |
| 14 | Initial Timeout | 15 | Initial Activity Timeout |
| 16 | Reboot | 17 | Format File System |
| 18 | Minimum Version | 19 | Maximum Version |
| 20 | Role | 21 | Minimum Non-Volatile Storage |
| 22 | Minimum Non-Volatile Storage | 23 | Reserved |
| 24 | Reserved | 25 | Required Attributes |
| 1000-9999 | Vendor Specific Commands | | |

Figure 17:
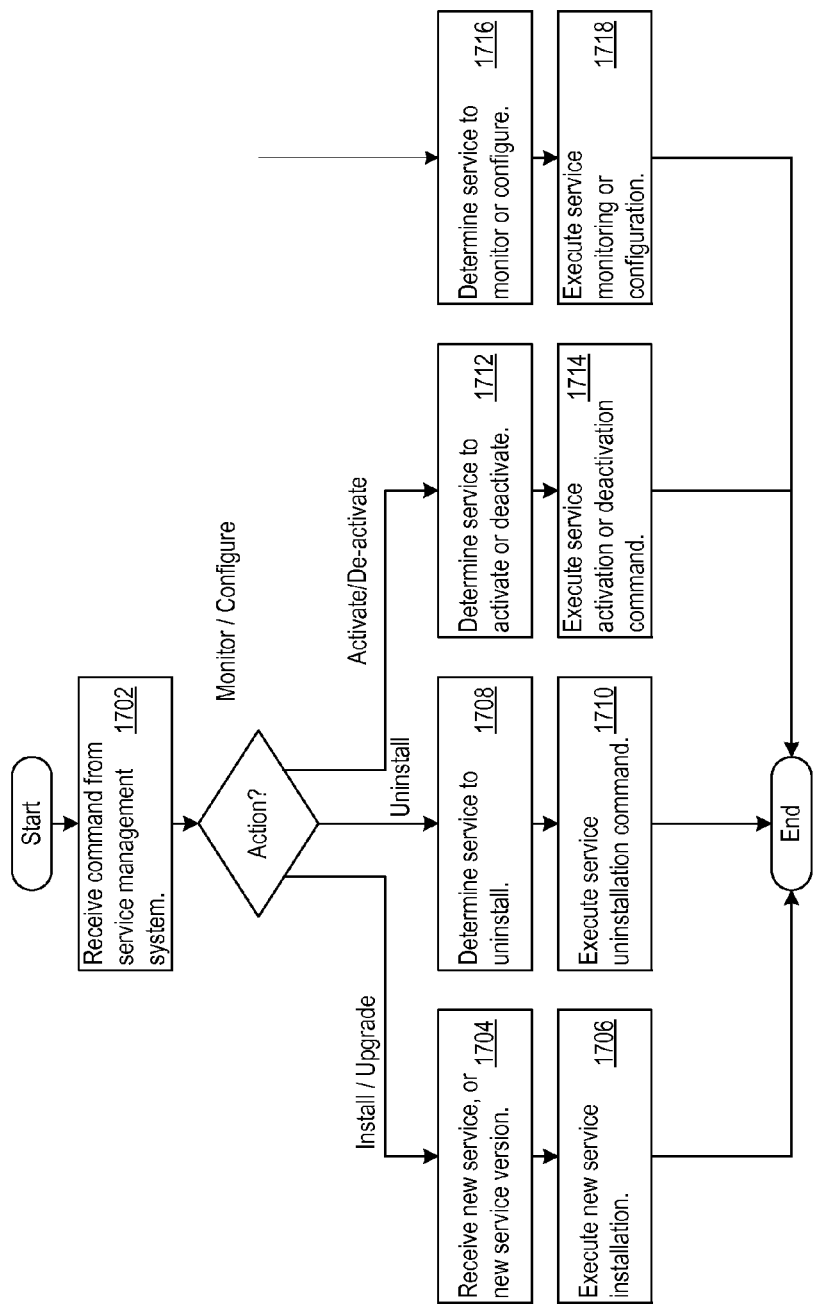
FIG. 17 shows a flow diagram of logic executed by a management service in a service platform.

FIG. 17 shows a flow diagram 1700 of logic executed by a management service 334 in a service platform 103. The management service 334 receives configuration messages communicated through the installed protocol (e.g., TR-069) from the management system 102 (1702). The management service 334 then executes control over the external services 332 and their parameters according to the configuration messages described in FIGS. 8-15 above.

For example, the management service 334 may execute an install or upgrade action by receiving a new service or service version (1704) and installing the new service version (1706) as explained in detail above with reference to FIGS. 8-11. As another example, the management service 334 may execute an uninstall of a service by determining, from the received command which service to uninstall (1708) and performing the uninstall process (1710) as explained in detail above with reference to FIGS. 12-13. The management service 334 also handles activation/deactivation of services as explained above with reference to FIG. 14. To that end, the management service 334 determines the service involved, and whether to activate or deactivate the service (1712), then executes the activation or deactivation (1714). In addition, the management service 334 handles service monitoring and configuration as explained in more detail with regard to FIG. 15. The management service 334 determines whether the received command requests monitoring or configuration, and which service is involved (1716). The management service 334 then executes the monitoring or configuration command on the identified service (1718).

The open gateway framework provides an open modular platform for service creation and execution that is device independent. The open gateway framework thereby facilitates less complex and faster application development, as well as remote management. The open gateway framework provides a modular software layer installed on a device, through which the open gateway framework permits service and application communication with device drivers and resources.

As an overview, the open gateway framework provides a package of functionality (e.g., the helpers) on top of the OGSi core (as well as extensions to the core), so that a new service can leverage any function in the package. The package may contain the most commonly used functional blocks from which new services are easily created. For example, a new service does not need to rewrite a home automation driver, but can leverage the driver functions already present in the pre-configured package of functionality.

Regardless of gateway, every service uses functions provided in the package, and the package translates those function calls into different specific operating system or driver calls, depending on the underlying hardware in the device. In this way, the services can be installed freely on any hardware platform without changing, as long as the new hardware platform has an open gateway framework installed. The open gateway framework abstracts the hardware layer to allow portable application development. In case of hardware changes, a specific version of the open gateway framework for the hardware will be released to support execution of already created services on the hardware.

The open gateway framework may include any combination of features, including: a software layer that leverages the OSGi Framework for service creation and execution, which allows application and service decoupling from device base software and hardware, such as the operating system that is tightly coupled to device hardware; a management platform, for remote device monitoring and management that is fully integrable with telecommunications service provider OSS/BSS systems; an application repository, for application publishing by the telecommunications service provider and third parties, as well as an application store through which a user may browse a catalog and choose the desired service; and an API for application development, with custom extensions to fulfill telecommunications service provider requirements.

One strength of the open gateway framework is that each service may be installed, updated and managed independently from the other services and from the device base software and hardware (e.g. the operating system). The services maybe developed by the telecommunications service provider or any other third party, according to any business model the telecommunications service provider wants to realize. The open gateway framework facilitates complete customer support for remote installation/uninstallation of new services, and activation/deactivation of services or services monitoring and configuration.

The logic and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device. The medium may be implemented as any device or tangible component that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions, or in software in an application programming interface (API) or in a Dynamic Link Library (DLL), functions available in a shared memory or defined as local or remote procedure calls, or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, implemented in libraries such as Dynamic Link Libraries (DLLs), or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A service platform architecture that operates on a device, the service platform architecture comprising:
a processor; and
a memory connected to the processor, the memory comprising:
an operating system comprising device drivers for system resources;
an abstraction layer between the device drivers and external services, the abstraction layer comprising:
core functions that communicate with the device drivers; and
helper functions that communicate with the core functions and that comprise an exposed consistent application programming interface (API) abstracted from the operating system and device drivers, the API operable to translate function calls from the external services to the core functions and operating system, and thereby to the device drivers, wherein each of the device drivers is configured to interface the abstraction layer to hardware of the device, wherein the external services correspond to code that resides on the device that communicates with the consistent API of the abstraction layer to control the hardware, and
wherein code that defines a given external service is written in a hardware and device driver independent manner such that a same service may reside on a second device that includes different hardware and device drivers for implementing functions associated with the external service;
a service management service among the external services, the service management service operable to manage the external services according to configuration messages received from a remote management system; and a communication interface operable to receive the configuration messages from the remote management system and communicate the configuration messages to the service management service.

2. The service platform architecture of claim 1, where the core functions are comprised in a dynamic module framework for executing code bundles of machine independent code.

3. The service platform architecture of claim 1, where the memory further comprises a datamodel of service parameters for the external services that are manipulated by the service management service.

4. The service platform architecture of claim 1, where the configuration message comprises a service installation message that directs the service management service to install a new external service sent to the service platform architecture.

5. The service platform architecture of claim 1, where the configuration message comprises a service parameter modification message that directs the service management service to change a service parameter for any of the external services.

6. The service platform architecture of claim 1, where the configuration message comprises a service deactivation message that directs the service management service to deactivate a specific external service, specified in the configuration message, from among the external services.

7. The service platform architecture of claim 1, where the configuration message comprises a service activation message that directs the service management service to activate a specific external service, specified in the configuration message, from among the external services.

8. A method for implementing a service platform on a device, the method comprising:

providing, on a device that includes a processor and a memory connected to the processor, an abstraction layer between device drivers in an operating system and external services, the abstraction layer comprising:

core functions that communicate with the device drivers; and helper functions that communicate with the core functions and that expose a consistent application programming interface (API) abstracted from the operating system and device drivers, the API operable to channel function calls in the external services to the core functions and operating system, and thereby to the device drivers, wherein each of the device drivers is configured to interface the abstraction layer to hardware of the device, wherein the external services correspond to code that resides on the device that communicates with the consistent API of the abstraction layer to control the hardware, and wherein code that defines a given external service is written in a hardware and device driver independent manner such that a same service may reside on a second device that includes different hardware and device drivers for implementing functions associated with the external service;

receiving configuration messages at a communication interface from a remote management system; and communicating the configuration messages to a service management service among the external services, the service management service operable to manage the external services according to the configuration messages.

9. The method of claim 8, where providing an abstraction layer comprises providing a dynamic module framework for executing code bundles of machine independent code.

10. The method of claim 8, further comprising defining in a memory a data model of service parameters for the external services that are manipulated by the service management service.

11. The method of claim 8, where receiving a configuration message comprises receiving a service installation message that directs the service management service to install a new external service sent to the service platform architecture.

12. The method of claim 8, where receiving a configuration message comprises receiving a service parameter modification message that directs the service management service to change a service parameter for any of the external services.

13. The method of claim 8, where receiving a configuration message comprises receiving a service deactivation message that directs the service management service to deactivate a specific external service, specified in the configuration message, from among the external services.

14. The method of claim 8, where receiving a configuration message comprises receiving a service activation message that directs the service management service to activate a specific external service, specified in the configuration message, from among the external services.

15. A non-transitory media machine readable medium including instructions which when executed by a processor in a data processing system device cause the processor to:

provide an abstraction layer between device drivers in an operating system and external services, the abstraction layer comprising:

core functions that communicate with the device drivers; and helper functions that communicate with the core functions and that expose a consistent application programming interface (API) abstracted from the operating system and device drivers, the API operable to channel function calls in the external services to the core functions and operating system, and thereby to the device drivers wherein each of the device drivers is configured to interface the abstraction layer to hardware of the device, wherein the external services correspond to code that resides on the device that communicates with the consistent API of the abstraction layer to control the hardware. and wherein code that defines a given external service is written in a hardware and device driver independent manner such that a same service may reside on a second device that includes different hardware and device drivers for implementing functions associated with the external service;

receiving configuration messages at a communication interface from a remote management system; and communicating the configuration messages to a service management service among the external services, the service management service operable to manage the external services according to the configuration messages.

* * * * *